(12) United States Patent
Lee

(10) Patent No.: US 7,213,100 B2
(45) Date of Patent: May 1, 2007

(54) METHOD AND APPARATUS FOR MASKING POSTAMBLE RINGING PHENOMENON IN DDR SDRAM

(75) Inventor: Geun Il Lee, Kyoungki-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 371 days.

(21) Appl. No.: 10/747,846

(22) Filed: Dec. 29, 2003

(65) Prior Publication Data
US 2004/0268028 A1    Dec. 30, 2004

(30) Foreign Application Priority Data
Jun. 30, 2003    (KR) .................. 10-2003-0043863

(51) Int. Cl.
*G06F 13/00*    (2006.01)
(52) U.S. Cl. ...................... 711/105; 711/154
(58) Field of Classification Search ............. 711/105, 711/154
See application file for complete search history.

(56) References Cited

U.S. PATENT DOCUMENTS 6,407,963 B1 *  6/2002  Sonoda et al. .......... 365/233.5
6,681,301 B1 *  1/2004  Mehta et al. ............ 711/154
6,785,189 B2 *  8/2004  Jacobs et al. ........... 365/233
6,918,016 B1 *  7/2005  Magro .................... 711/154
2005/0015560 A1 *  1/2005  Bae ........................ 711/167

OTHER PUBLICATIONS

'General DDR SDRAM Functionality', Micron Technical Note, TN-46-05, pp. 1-11, Micron Technology Inc., 2001.*

* cited by examiner

*Primary Examiner*—Reba I. Elmore
(74) *Attorney, Agent, or Firm*—Ladas & Parry LLP (57) ABSTRACT

A method for apparatus for masking a postamble ringing phenomenon in a DDR SDRAM comprising the steps of storing data, which are applied from a memory controller, in a data input latch through a data buffer and aligning the stored data, controlling the data input latch in such a manner that the data stored in the data input latch do not change, transmitting the data stored in the data input latch to a data input/output detection amplifier, enabling the data input latch to receive new data after the data, which have been transmitted to the data input/output detection amplifier, are transmitted to a global input/output line. In the method, a stable write operation can be performed even in devices having high operation speeds, such data rates above 400 MHz. Thus, a stable write operation can be performed under conditions wherein the tDQSS has a value of 0.75tCK to 1.25tCK.

12 Claims, 6 Drawing Sheets

METHOD AND APPARATUS FOR MASKING POSTAMBLE RINGING PHENOMENON IN DDR SDRAM

BACKGROUND OF THE INVENTION

1. Field of the Invention

The present invention relates to a method and an apparatus for masking a postamble ringing phenomenon in a memory device, and more particularly to a method and an apparatus for masking a phenomenon so as to avoid invalid data being written by the postamble ringing phenomenon in a write operation in a DDR SDRAM.

2. Description of the Prior Art

In general, when a write operation is performed in a DDR SDRAM, data are synchronized with a DQS signal outputted from a memory controller to be transmitted to a global input/output line in a memory device. However, when the memory controller transmits the DQS signal to the memory device, a ringing phenomenon may occur after a postamble. In this case, the memory device may write invalid data and cause an abnormal operation.

Hereinafter, the ringing phenomenon caused after the postamble will be described with reference to the following drawings.

Figure 1:
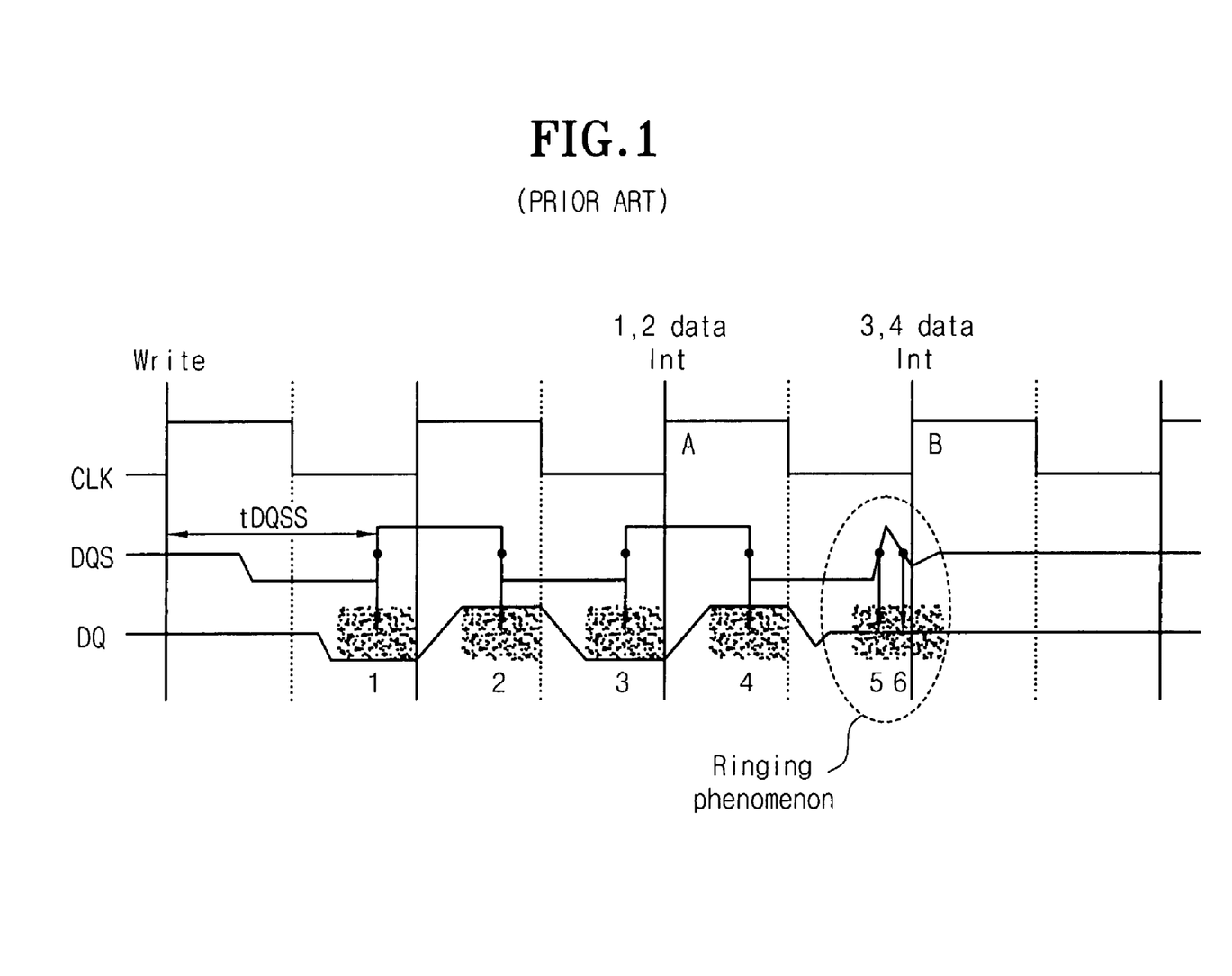
FIG. 1 is a time chart illustrating a general conventional postamble ringing phenomenon.

FIG. 1 is a time chart of signal voltage levels illustrating a general postamble ringing phenomenon. In FIG. 1, "CLK" represents an exterior main clock signal applied to a DDR SDRAM. A DQS signal is a signal applied from a memory controller, and data are synchronized with a rising and a falling edge of the DQS signal and are then applied. Further, DQ represents data applied to a memory device. The time interval "tDQSS" represents a time until a rising edge of a first DQS signal occurs after a write command is applied, and the "tDQSS" is generally determined as having a value of 0.75tCK to 1.25tCK. Herein, the "tCK" represents a period of the exterior main clock signal CLK. In reference, in FIG. 1, the data DQ sequentially inputted are marked by reference numerals 1, 2, 3, and 4, and reference numerals 5 and 6 refer to invalid data which may be applied as a result of a ringing phenomenon.

Figure 2:
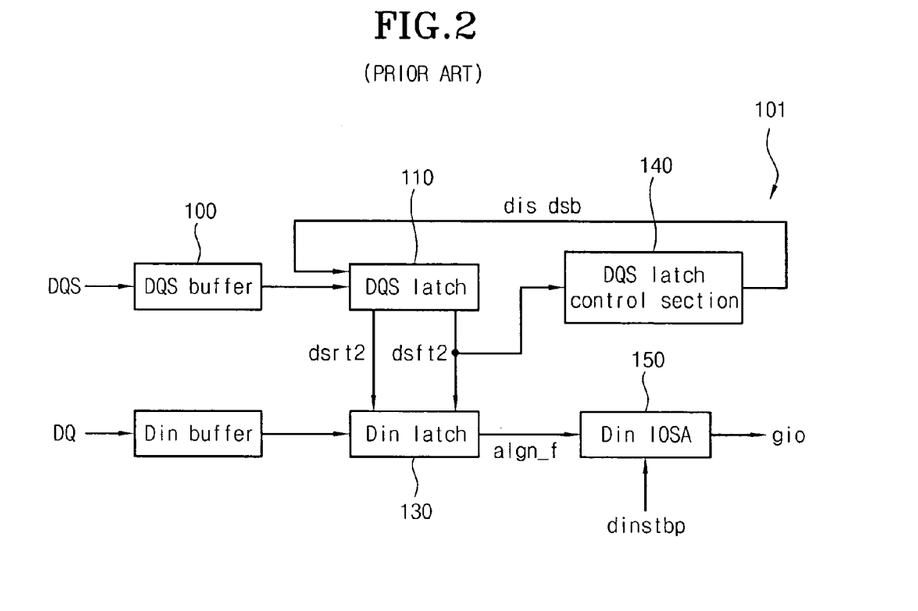
FIG. 2 is a block diagram of a conventional data input terminal used in order to prevent occurrence of an operation fail due to a postamble ringing phenomenon.

In a general write operation, data 1 and 2, which are synchronized with a rising and a falling edge of the first DQS signal to be inputted, are synchronized with a time point A of the exterior main clock signal CLK to be transmitted to an input terminal of a data input/output detection amplifier Din IOSA 150 (FIG. 2). Data 3 and 4, which are synchronized with a rising and a falling edge of a second DQS signal to be inputted, are synchronized with a point B of the exterior main clock signal CLK to be transmitted to the input terminal of the data input/output detection amplifier 150.

However, as shown in FIGS. 1 and 2, when a ringing phenomenon (i.e., an unstable shift state of a DQS signal) occurs after a write postamble, a DQS buffer 100, which receives the DQS signal determines the DQS signal, which is shifted to an unstable state by the ringing phenomenon, to be a valid DQS signal. Therefore, invalid voltage levels 5 and 6 on the DQ signal are synchronized with a rising and falling edge of the DQS signal and thereby are substituted for valid data 3 and 4 stored in a data input latch Din latch 130. This causes a problem in that the invalid data 5 and 6 are undesirably synchronized with the point B of the exterior main clock signal CLK, and are then transmitted to the input terminal of the data input/output detection amplifier 150.

FIG. 2 is a block diagram of a conventional data input terminal 101 used in order to prevent the occurrence of an operation fail due to a postamble ringing phenomenon. As shown in FIG. 2, in order to prevent the ringing phenomenon from occurring, when a falling edge of the last DQS signal (shown in FIG. 1 as a falling edge of the second DQS signal) outputted from a DQS latch 110 occurs, the DQS latch 110 is disabled by means of a DQS latch control section 140 issuing a control signal "dis dsb" upon receiving the last DQS signal. Disabling the DQS latch 110 prevents the operation failure due to the ringing phenomenon.

However, this conventional method has a problem in that the method does not perform a stable write operation if tDQSS has a value of 0.75tCK to 1.25tCK. That is, in the case of the DQS falling signal, the DQS falling signal is received to disable the buffer 150, and the buffer 100 must be in a standby state before the next DQS falling signal is inputted. However, it is impossible to accurately control the timing sequence so as to cause the buffer 100 to be in a standby state before the next DQS falling signal is inputted. In some cases, the conventional method cannot completely mask a wide range of ringing phenomena that may be generated after the tDQSS having a value of 0.75tCK to 1.25tCK.

Further, when only the falling signal of a DQS buffer 100 is controlled, a timing mismatch may be generated during a rising and falling edge of the DQS signal, in comparison with the exterior main clock signal CLK. In such a case, as compared with the exterior main clock signal CLK, it is difficult to identically control the rising timing and falling timing sequences of the DQS signal as a result of variations in the process, voltage, and temperature (PVT) conditions. Accordingly, the conventional method cannot be easily employed in a memory device operating at high speeds.

SUMMARY OF THE INVENTION

Accordingly, the present invention has been made to solve the above-mentioned problems occurring in the prior art devices, and it is an object of the present invention to provide a method and an apparatus for masking a postamble ringing phenomenon in a memory device, which can prevent the input of error data due to the ringing phenomenon caused in a write operation in a memory device, and which can perform a stable write operation under conditions in which a tDQSS has a value of 0.75tCK to 1.25tCK.

In order to achieve the above object, according to one aspect of the present invention, there is provided a method for masking a postamble ringing phenomenon in a DDR SDRAM comprising the steps of storing data, which are applied from a memory controller, in a data input latch through a data buffer and aligning the stored data controlling the data input latch so that the data stored in the data input latch do not change transmitting the data stored in the data input latch to a data input/output detection amplifier enabling the data input latch to receive new data after the data, which have been transmitted to the data input/output detection amplifier, are transmitted to a global input/output line.

Step b can further comprise an enable interval of a signal controlling the data input latch that is adjusted so that the data stored in the data input latch do not change.

In order to achieve the above object, according to one aspect of the present invention, there is provided a method for masking a postamble ringing phenomenon in a DDR SDRAM comprising the steps of storing data, which are applied as a signal received from a memory controller, in a data input latch through a data buffer and aligning the stored data, and controlling the data input latch so that the data stored in the data input latch can maintain its data value before the data stored in the data input latch are transmitted to a global input/output line through a data input/output detection amplifier.

The present invention further comprises after step b, a step of resetting the data input latch so as to revert to a state in which the data input latch can receive new data. According to another aspect of the present invention, there is provided a method for masking a postamble ringing phenomenon in a DDR SDRAM comprising the steps of receiving a DQS signal through a DQS buffer, and receiving a plurality of data, including first and second data, through a data input buffer storing the DQS signal outputted from the DQS buffer in a DQS latch generating a first signal synchronized with a rising edge of the DQS signal, and generating a second signal synchronized with a falling edge of the DQS signal storing the first data from among the plurality of data outputted from the data input buffer in the data input latch synchronized with a rising edge of the first signal storing the second data from among the plurality of data outputted from the data input buffer in the data input latch synchronized with a rising edge of the second signal transmitting the first data and the second data, which are stored in the data input latch, to a data input/output detection amplifier synchronized with a falling edge of the second signal and controlling operation of the data input latch by means of a control signal which is synchronized with the rising edge of the second signal in step e and is then generated.

In the present invention, operation of the DQS latch is masked while the control signal maintains an enabled state at a high level.

In the present invention, the control signal is disabled by a data in a strobe pulse signal which enables the data input/output detection amplifier.

In the present invention, a step of providing a ringing phenomenon mask section, which generates the control signal that is synchronized with the rising edge of the second signal, can adjust its own delay time, thereby adjusting an enable interval of the control signal.

BRIEF DESCRIPTION OF THE DRAWING FIGURES

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings.

Figure 3:
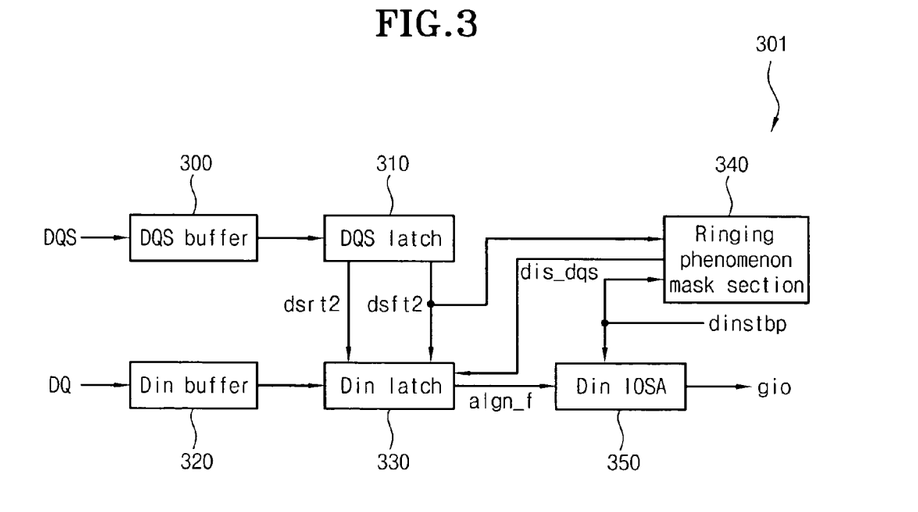
FIG. 3 is a block diagram of a data input section for masking a postamble ringing phenomenon in a memory device, according to the present invention.

FIG. 3 is a block diagram of a data input section 301 for masking a postamble ringing phenomenon in a memory device, according to the present invention.

In FIG. 3, a DQS buffer 300 receives and buffers a DQS signal, and a DQS latch 310 receives a signal outputted from the DQS buffer 300 and latches the received signal.

A Din buffer 320, which is a data input buffer, receives and buffers a data signal DQ, and a Din latch 330, which is a data input latch, receives a signal outputted from the Din buffer 320 and latches the received signal.

A Din IOSA 350, which is a data input/output detection amplifier, receives and amplifies data outputted from the Din latch 330, and then transmits the amplified data to a global input/output line, as shown.

Lastly, when a falling edge of a DQS signal outputted from the DQS latch 310 occurs, a ringing phenomenon mask section 340, which is a feature of the present invention, receives the DQS signal to output a signal Dis_dqs controlling an operation of the Din latch 330.

Hereinafter, an operation of the data input section 301 shown in FIG. 3 will be described.

In a write operation, data DQ (e.g., data 1 and 2 in FIG. 1) are synchronized with a rising and a falling edge of the first DQS signal, which is inputted from a memory controller, and are then stored in the Din latch 330.

The data DQ stored in the Din latch 330 are synchronized with a falling edge of a DQS signal, which is outputted from the DQS latch 310, to be aligned, and then applied to a Din IOSA 350. Herein, output data from the Din latch 330 are expressed by reference mark algn_f, which are synchronized with a falling edge of a DQS signal outputted from the DQS latch 310, are aligned, and are then applied to the Din IOSA 350.

Next, the data stored in the Din IOSA 350 are transmitted to the global input/output line by data in strobe pulse signal "dinstbp" which enables operation of the Din IOSA 350.

This operation can be employed when data DQ (e.g., data 3 and 4 in FIG. 1) are synchronized with a rising and a falling edge of the second DQS signal, and are then stored in the Din latch 330.

For reference, a first signal dsrt2 and a second signal dsft2 are generated by reference to the DQS signal. The first signal is synchronized with a rising point of the DQS signal to be generated, and the second signal is synchronized with a falling point of the DQS signal to be generated. Further, data are synchronized with rising edges of the first and the second signal, latched in the data input latch 330, and are then transmitted to the data input/output detection amplifier 350 at a falling point of the second signal.

Herein, as described in the prior art with reference to FIGS. 1 and 2, the ringing phenomenon occurs after the postamble, data 3 and 4, which are synchronized with the rising and the falling edge of the invalid DQS signal caused by the ringing phenomenon. These data 3 and 4, synchronized with the falling edge of the last DQS signal (e.g., the second DQS signal in FIG. 1), are stored in the Din latch 330, and are then aligned, but then may be replaced with error data (5 and 6 in FIG. 1).

In order to mask this ringing phenomenon, the present invention provides the ringing phenomenon mask section 340, as shown in FIG. 3. When the falling edge of the DQS signal outputted from the DQS latch 310 occurs, the ringing phenomenon mask section 340 receives the DQS signal to output a signal Dis_dqs for controlling the operation of the Din latch 330, which is a data input latch. Herein, the Din latch 330 does not change the data, which are stored in the Din latch 330, because the operation is prevented by the control signal Dis_dqs. Further, the ringing phenomenon mask section 340 enables new data to be applied to the Din latch 330 by the data in the strobe pulse signal "dinstbp" or by a timing signal equal to the data in the strobe pulse signal "dinstbp".

Figure 4:
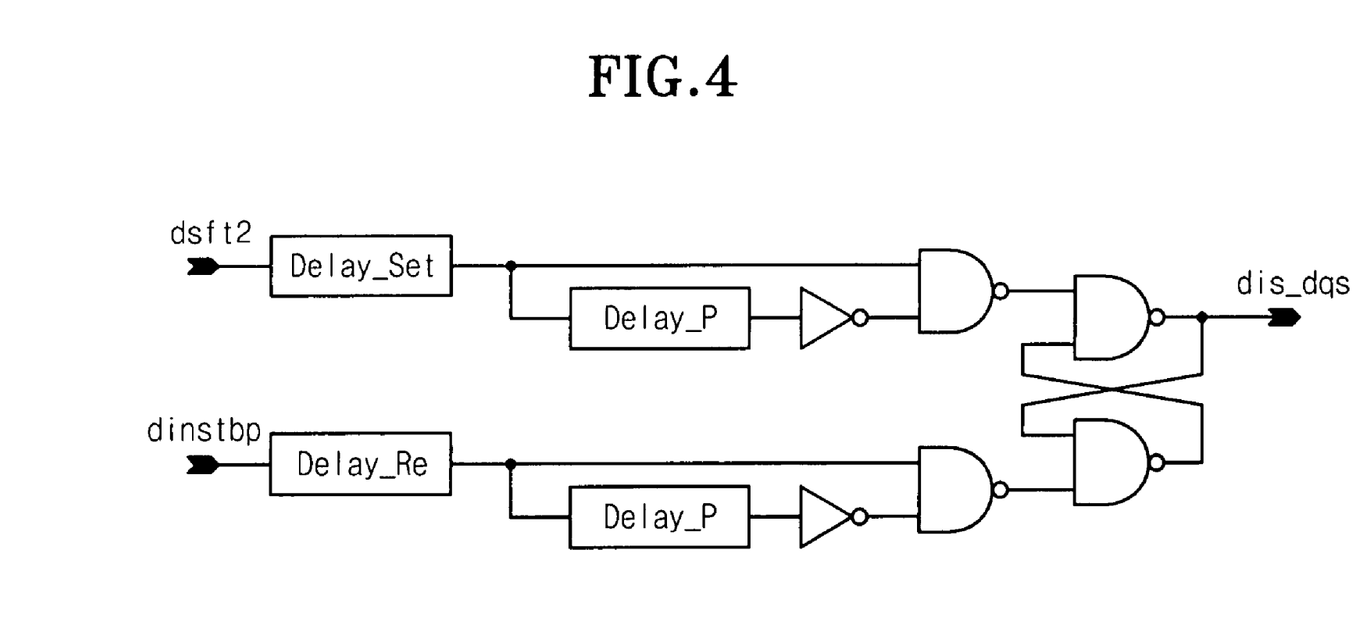
FIG. 4 is a block diagram of the ringing phenomenon mask section according to a first embodiment of the present invention.

Hereinafter, the operation of the ringing phenomenon mask section 340, which is a feature of the present invention, will be described with reference to FIG. 4. FIG. 4 is a block diagram of the ringing phenomenon mask section 340 (FIG. 3) according to a first embodiment of the present invention.

In FIG. 4, a delay set section Delay_Set receives a dsft2 signal to delay the received dsft2 signal by a predetermined time. The delay time in the delay set section Delay_Set determines the time during which the data, stored in the data input latch, is prevented from changing.

A delay reset section Delay_Re receives the data in the strobe pulse signal "dinstbp" or the timing signal equal to the data in strobe pulse signal "dinstbp" and resets the output signal dis_dqs output by the ringing phenomenon mask section. The delay time in the delay reset section Delay_Re determines the time which is necessary to enable the data input latch to receive new data and store the received data.

A delay pulse section Delay_P adjusts the pulse width of an inputted signal.

In operation, timing of the delay set section Delay_Set is adjusted to a time until the dsft2 signal aligns valid data and latches the aligned data. The timing enables the valid data to be latched when the dsft2 signal is inputted. The dsft2 signal delayed by the delay set section Delay_Set enables the output signal dis_dqs of the ringing phenomenon mask section (see a high level in FIGS. 7A and 7B) and transmits the enabled signal to the Din latch 330 which is the data input latch. Herein, data stored in the Din latch 330 maintains valid data intact before a reset signal is inputted.

In order to disable Dis_dqs signal to permit the Din latch 330 to again receive the next data, it is sufficient for the Din latch 330 to reset again. The reset operation of the Din latch 330 is performed by the dinstbp signal or a signal having the same timing as that of the dinstbp signal. Herein, it is preferred that timing of the delay reset section Delay_Re is adjusted so that the reset operation with respect to the Din latch 330 is performed after the data stored in the data input latch are outputted and transmitted to a global input/out line. Accordingly, when the reset operation with respect to the Din latch 330 is performed by the Dis_dqs signal, the data input latch can receive the next data, and then latch the received next data.

Figure 5:
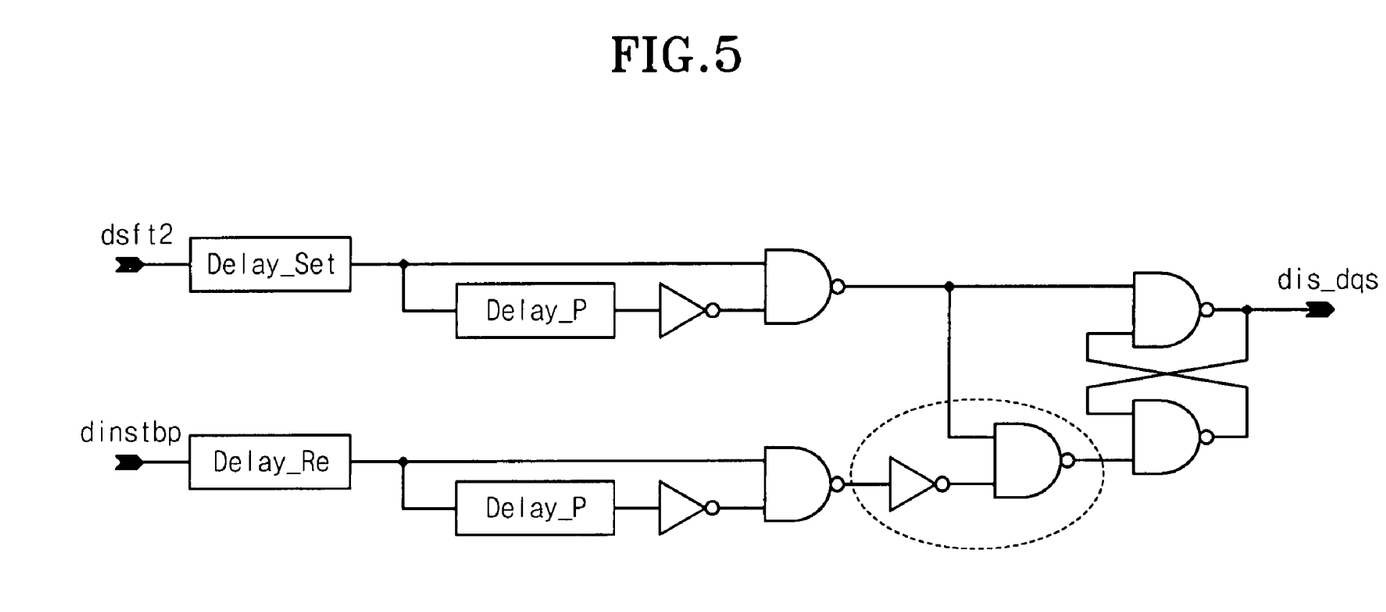
FIG. 5 is a block diagram of the ringing phenomenon mask section according to a second embodiment of the present invention.
Figure 6:
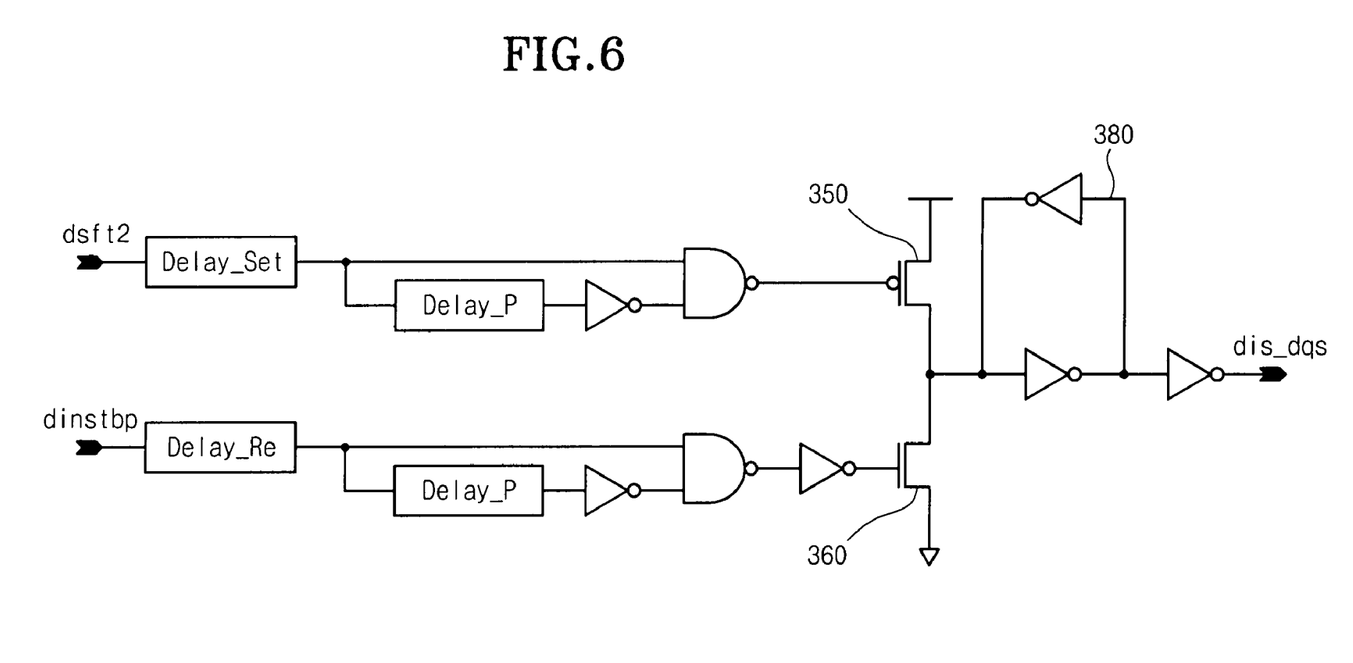
FIG. 6 is a block diagram of the ringing phenomenon mask section according to a third embodiment of the present invention.

FIG. 5 is a block diagram of a ringing phenomenon mask section according to a second embodiment of the present invention, and FIG. 6 is a block diagram of a ringing phenomenon mask section according to a third embodiment of the present invention. Those skilled in the art can embody various ringing phenomenon mask sections which perform identical or similar operations as those described relative to the ringing phenomenon mask section shown in FIGS. 4 and 6. For reference, the circuit shown in FIG. 5 is realized so that the circuit prevents two input signals from coming into a negative state, internally adjusts operation timing of the two input signals, thereby normally operating even when the circuit is operating at a high frequency. Further, when the circuit shown in FIG. 6 is used, a NMOS transistor 360, a PMOS transistor 370, and a latch section 380 are used, and therefore the physical size on a chip of the circuit can be reduced.

The delay time of the delay sections in the ringing phenomenon mask sections shown in FIGS. 4 to 6 are adjusted, so that an enable adjustability of the interval of the control signal dis_dqs, which enables the data stored in the data input latch 330 not to change. Accordingly, those skilled in the art may discover methods allowing the free adjustment of the operation timing and the operation interval of the control signal dis_dqs according to the operation frequency of a memory device, so that a timing margin may be secured.

The method for masking postamble ringing phenomenon according to the present invention will be described with reference to FIGS. 7a and 7b, each showing time charts of signals used in the devices illustrated in FIGS. 3 to 6. For reference, FIG. 7a is a view illustrating a method for masking the postamble ringing phenomenon when the tDQSS has a value of 0.75tCK, and FIG. 7b is a view illustrating a method for masking the postamble ringing phenomenon when the tDQSS has a value of 1.25tCK.

Figure 7A:
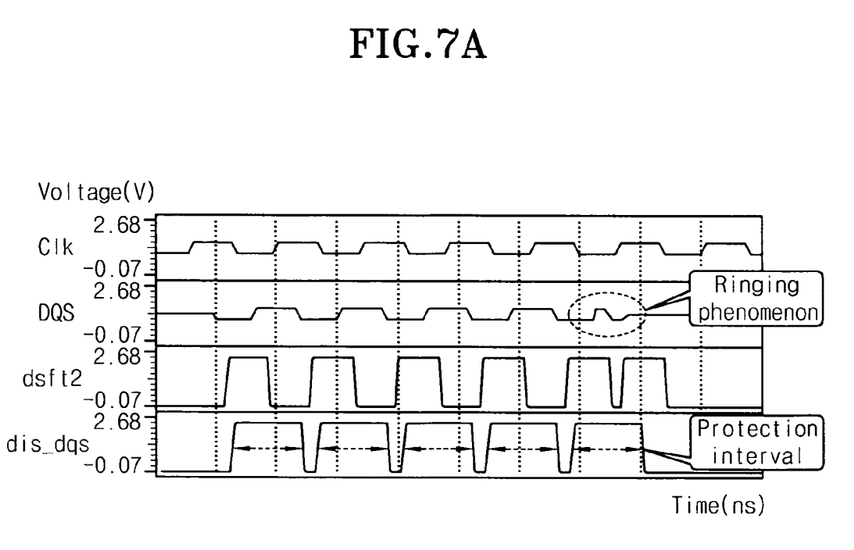
FIGS. 7a and 7b are time charts of the voltage signals propagated in the devices shown in FIGS. 3 to 6.
Figure 7B:
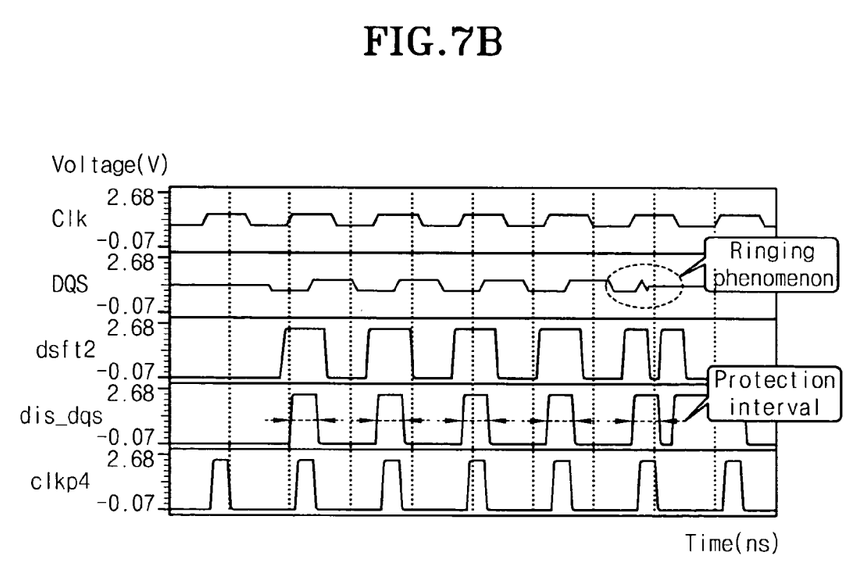

As shown in FIG. 7a, the control signal Dis_dqs outputted from the ringing phenomenon mask section 340 is enabled at a high level by the synchronization with signal dsft2. The high level interval (enabled interval) of the control signal Dis_dqs is a protection interval so as to prevent change of the data stored in the Din latch 330, which is the data input latch. A low level interval (disabled interval) of the control signal Dis_dqs is a reset interval enables new data to be applied to the Din latch 330. As shown in FIG. 7a, when the ringing phenomenon is caused by the DQS signal, since the control signal Dis_dqs maintains an enabled state, the data stored in the Din latch 330, which is the data input latch, can safely be maintained.

The method described with reference to FIG. 7a can be employed even in the case of when the tDQSS has a value of 1.25tCK. In FIG. 7b the postamble ringing phenomenon is shown being masked under such conditions, wherein clkp4 represents a signal having the same timing clock sequence as that of the dinstbp signal. For reference, as shown in FIG. 3, data stored in the Din IOSA 350 are transmitted to the global input/output line at the rising edge of the dinstbp signal (i.e., a clkp4 signal in FIG. 7b).

In the method for masking the postamble ringing phenomenon according to the present invention as described above, when valid data are stored in the data input latch 330 to be aligned, the aligned data are not changed by means of the ringing phenomenon mask section, and the data input latch 330 normally can receive the next data (new data) after the aligned data are transmitted to the global input/output line by the data in the strobe pulse signal. That is, in the present invention, the data in strobe pulse signal is used to prevent invalid data from being written in a memory cell by a postamble ringing phenomenon, during a write operation. Further, the data stored in the data input latch are maintained and protected from changing for a predetermined time before the data in the strobe pulse signal is applied.

As described above, when a circuit for masking an abnormal operation due to a ringing phenomenon is constructed by one of the methods according to the present invention, a stable write operation can be performed even at high operation speeds, for example, those having a data rate more than 400 MHz. Further, as shown in FIGS. 7a and 7b, a stable write operation can be performed under the condition in which the tDQSS has a value of 0.75tCK to 1.25tCK.

The preferred embodiments of the present invention have been described for illustrative purposes, and those skilled in the art will appreciate that various modifications, alterations, additions and substitutions are possible, without departing from the scope and spirit of the invention as recited in the accompanying claims.

What is claimed is:

1. A method for masking a postamble ringing phenomenon in a DDR SDRAM, the method comprising the steps of:
   a) storing data, which are applied from a memory controller, in a data input latch through a data buffer and aligning the stored data;
   b) controlling the data input latch so that the data stored in the data input latch do not change;
   c) transmitting the data stored in the data input latch to a data input/output detection amplifier after a predetermined time delay; and
   d) enabling the data input latch to receive new data after the data, which have been transmitted to the data input/output detection amplifier, are transmitted to a global input/output line.

2. The method as claimed in claim 1, wherein in step b, an enable interval of a signal controlling the data input latch is adjusted so that the data stored in the data input latch do not change.

3. The method as claimed in claim 2, wherein the signal, which controls the data input latch to prevent the data stored in the data input latch from changing, is generated by a signal which is synchronized with a falling edge of a DQS signal before it is generated.

4. A method for masking a postamble ringing phenomenon in a DDR SDRAM, the method comprising the steps of:
   a) storing data, which are applied as a signal received from a memory controller, in a data input latch through a data buffer and aligning the stored data; and
   b) controlling the data input latch so that the data stored in the data input latch can maintain its data value for a predetermined time interval, before the data stored in the data input latch are transmitted to a global Input/output line through a data input/output detection amplifier.

5. The method as claimed in claim 4, further comprising, after step b, a step of resetting the data input latch so as to revert to a state in which the data input latch can receive new data.

6. The method as claimed in claim 4 or 5, wherein in step b, an enable Interval of a signal controlling the data input latch is adjusted to prevent the data stored in the data input latch from changing during said predetermined time interval.

7. A method for masking a postamble ringing phenomenon in a DDR SDRAM, the method comprising the steps of:
   a) receiving a DOS signal through a DQS buffer, and receiving a plurality of data, including a first data and second data, through a data input buffer;
   b) storing the DQS signal outputted from the DQS buffer in a DQS latch;
   c) generating a first signal synchronized with a rising edge of the DQS signal, and generating a second signal synchronized with a falling edge of the DQS signal;
   d) storing the first data from among the plurality of data outputted from the data input buffer in the data Input latch synchronized with a rising edge of the first signal;
   e) storing the second data from among the plurality of data outputted from the data input buffer in the data input latch synchronized with a rising edge of the second signal;
   f) after a predetermined time interval, transmitting the first data and the second data, which are stored in the data input latch, to a data input/output detection amplifier, synchronized with a falling edge of the second signal; and
   g) controlling operation of the data input latch by means of a control signal which is synchronized with the rising edge of the second signal in step e and is then generated.

8. The method as claimed in claim 7, wherein operation of the DQS latch is masked while the control signal maintains an enabled state at a high level.

9. The method as claimed in claim 8, wherein the control signal is disabled by a data in a strobe pulse signal which enables the data input/output detection amplifier.

10. The method as claimed in claim 7, further comprising a step of providing a ringing phenomenon mask section which generates the control signal synchronized with the rising edge of the second signal, that can adjust its own delay time, thereby adjusting an enable interval of the control signal.

11. An apparatus for masking a postamble ringing phenomenon in a DDR SDRAM, the apparatus comprising:
    a data strobe buffer for receiving a data strobe signal from a memory controller;
    a data strobe latch for latching the data strobe signal outputted from the data strobe buffer;
    a data buffer for receiving data applied from a memory controller;
    a data latch for latching the data outputted from the data buffer for a predetermined time interval and thereafter transmitting the latched data to a data input/output detection amplifier in response to an output signal received from the data strobe latch; and
    a ringing phenomenon mask section for controlling the operation of the data latch in response to the output signal of the data strobe latch.

12. The apparatus as claimed in claim 11, wherein the data strobe signal is a clock signal, the ringing phenomenon mask section includes means to synchronize the control signal with a falling edge of the clock signal and generates the control signal thereafter, so that data transmission from the data buffer to the data latch is masked when the ringing phenomenon mask section is enabled.

* * * * *